United States Patent [19]

Haberman

[11] 4,038,100

[45] July 26, 1977

[54] CHAR COMPOSITION AND A METHOD FOR MAKING A CHAR COMPOSITION

[75] Inventor: Charles E. Haberman, Tarzana, Calif.

[73] Assignee: The Oil Shale Corporation (Tosco), Los Angeles, Calif.

[21] Appl. No.: 604,874

[22] Filed: Aug. 14, 1975

Related U.S. Application Data

[63] Continuation-in-part of Ser. No. 578,338, May 16, 1975, abandoned.

[51] Int. Cl.$^2$ .......................... C01B 31/08; C09C 1/44
[52] U.S. Cl. ...................................... 106/307; 423/445; 423/449; 201/2.5; 201/25; 208/11 R; 252/421; 252/445
[58] Field of Search ................. 106/307; 423/445, 449; 201/2.5, 25; 208/11 R; 252/421, 445

[56] References Cited

U.S. PATENT DOCUMENTS

| 3,442,789 | 5/1969 | Zimmerman | 208/11 R |
| 3,496,094 | 2/1970 | Smith | 208/11 R |
| 3,644,131 | 2/1972 | Gotshall | 106/307 |
| 3,691,056 | 9/1972 | Barney et al. | 208/11 R |
| 3,823,221 | 7/1974 | Wakefield et al. | 106/307 |
| 3,823,223 | 7/1974 | Liska et al. | 106/307 |
| 3,823,224 | 7/1974 | Laman et al. | 186/307 |
| 3,875,077 | 4/1975 | Sanga | 423/449 |
| 3,886,088 | 5/1975 | DeJong | 423/449 |

Primary Examiner—Winston A. Douglas
Assistant Examiner—J. V. Howard
Attorney, Agent, or Firm—Poms, Smith, Lande & Glenny

[57] ABSTRACT

Disclosed are a composition produced from rubber containing polymeric hydrocarbons and carbon black by pyrolyzing and grinding such rubber with heated balls for a sufficient length of time to vaporize and depolymerize the hydrocarbons and to produce a solid char material having a very fine particle size, said char material being free of nondecomposed rubber and coke and having a benzene discoloration number of greater than 70% and preferably 90%, and the related method of making the composition. If the rubber also contains fiberglass and metal, the solid material produced in the pyrolyzing and grinding step will contain fiberglass and metal. The fiberglass and metal are separated from the solid char particles by mechanical means using no caustic, acid or organic solvents. The resulting char may be used, among other things, as a substitute for carbon black in the production of various products such as tires.

11 Claims, No Drawings

CHAR COMPOSITION AND A METHOD FOR MAKING A CHAR COMPOSITION

This application is a continuation-in-part of U.S. patent application Ser. No. 578,338, filed May 16, 1975, now abandoned.

In the past decades our civilization has grown more complex and as a direct result the use of natural raw materials has increased and the problem of disposing of our waste material without polluting our environment has also increased. One of the prime areas where both problems are serious is in the rubber tire field. For example, the use of automobiles has increased greatly thereby increasing the use of tires. However, since tires are made basically of polymeric hydrocarbons and natural resources such as carbon black, etc. this increased use has put a strain on our natural resources. Moreover, the problem of disposing of waste rubber such as tires has been compounded because of the increased waste produced by the increased use. More importantly, scrap rubber such as rubber tires are not easily disposed of without polluting the environment. For example, rubber cannot easily be burned because of the consequent air pollution and rubber is not biodegradable.

In view of the foregoing problems, it is not surprising that prior art workers are attempting to dispose of waste rubber such as tires by devising methods for separating the raw material used in the tires (e.g. hydrocarbons) and then reusing the raw materials. Particular attention has been paid to pyrolyzing raw scrap tires in order to depolymerize and volatilize the hydrocarbons contained therein and condensing the hydrocarbons into their various oil fractions. However, after pyrolysis a rather large percentage of the tire remains as a solid. What to do with this solid has posed a considerable problem since, for the most part, the solid cannot be reused for producing more tires and the disposal of the solid presents a problem.

This problem of what to do with the solids left after pyrolyzing raw scrap rubber has been compounded because of the increased use of metal and fiberglass in tires. For the most part, this problem has been overlooked by the prior art.

Thus, it is desirable to provide a process for recycling rubber, especially scrap rubber such as tires, by separating the rubber into its components, and using these components as natural resources for the production of other articles. It is of particular importance in the art to develop and embody uses for the solid material which remains after pyrolyzing a rubber tire.

It is therefore the primary object of the present invention to provide a char made from solid material remaining after the pyrolysis of carbon black containing rubber that can be utilized for the sme purposes as carbon black.

The present invention is predicated, in part, upon the rather surprising discovery that solid material resulting from the pyrolysis of rubber containing carbon black may be utilized to replace, in substantial part, the carbon black utilized in the production of rubber tires and other rubber products if the char contains substantially no metal or fiberglass, has not been treated with acid, caustic or organic solvents, and the pyrolysis and grinding is conducted simultaneously by using heat carrying solids such as ceramic balls.

As is known in the art, rubber tires are composed of rubber (either natural or synthetic), vulcanizing agents such as sulfur, anti-oxidants, accelerators and activators such as zinc oxide, plasticizers such as stearic acid, fillers and pigments such as carbon black and various other chemicals. In addition, tires today contain rather large amounts of metals such as steel as well as fiberglass. One of the major portions of rubber tires (other than rubber) is carbon black and therefore it is particularly desirable if a substitute for carbon black could be developed which is obtained from scrap rubber.

I have found that any type of rubber utilized for making tires and other products can be utilized as a starting material in the present invention. As is known, natural rubber is merely a polymerization product of isoprene. Synthetic rubbers are generally polymerized from different monomers and therefore, perhaps, strictly speaking they should not be called rubbers. Nevertheless the term is now established in the art and this term will be used herein. Synthetic rubbers which are commonly used in the tire industry include isoprene, isobutylene-isoprene, nitrile-butadiene, polybutadiene, butyl rubber and stryenebutadiene copolymer (SBR). Whenever the term "rubber" is used in the specification and claims it is intended to include both natural and synthetic rubbers such as those exemplified above.

The present invention contemplates utilizing carbon black containing rubber of any source and pyrolyzing and grinding such rubber simultaneously by utilizing heat carrying solids heated to a sufficient temperature to pyrolyze the rubber. The pyrolysis is conducted in the absence of air (oxygen) and, at the same time, the heat carrying solids are used to grind the rubber as, for example, inserting the rubber and heat carrying solids into a rotating retort which, a noted, should be sealed in order to prevent air from contacting the rubber during the pyrolysis.

Since a significant problem in society today is the disposal of rubber tires the present invention particularly contemplates utilizing scrap rubber tires which, in general, will contain rubber (synthetic or natural), carbon black, a vulcanizing agent such as sulfur, metal, fiberglass and other compounds usually found in tires such as zinc oxide, anti-oxidants, stearic acid, and softeners. The major ingredients of rubber tires are hydrocarbon polymers (the rubber) and carbon black.

Whatever scrap rubber is utilized it is preferred if the rubber is first shredded or ground to an appropriate size, for example, particles of less than 3 inches. The shredded rubber, which may contain as much as 9–10% by weight of surface moisture, is then preferably dried at an appropriate temperature (e.g., slightly above the boiling point of water such as about 225° F.) in an appropriate dryer. Higher temperatures (e.g. 225°-250° F.) may be more desirable where the rubber is not adversely affected because moisture is driven off more rapidly than at lower temperatures. It is to be understood that both of the foregoing steps are not necessary in the present invention but are primarily for economic reasons.

In any event, the raw rubber, either per se or after being shredded and dried, is fed into a rotating retort together with heat-carrying solids, the temperature of the solids being sufficient to heat the rubber to the pyrolysis temperature for a period of from about 3 minutes to 10 minutes and preferably between 5 and 8 minutes. In general, the temperature of the heat-carrying solids may range from about 1100° F. to 1500° F. The rotational speed of the retort is sufficient to mix the heat-carrying solids with the rubber in order to obtain good heat transfer between the rubber and heat-carrying solids. In general, because of the rotation and pyrolysis temperature the solid material produced has a fine particle size. The pyrolysis temperature may range from about 850° F. to as high as about 1200° F. and is preferably between about 850° and about 1000° F. The rotational speed of the retort is dependent upon the diameter thereof. For example a retort having a diameter of 6 feet would, in the preferred exemplary embodiment, range from about 1 revolutions per minute (rpm) to about 3 rpm whereas a retort having a diameter of about 2 feet would rotate at about 4 rpm to about 15 rpm. It is of course understood that the mixing of the heat-carrying solids with the rubber and the grinding thereof may be conducted in any appropriate manner. In the preferred exemplary embodiment the retort has a cylindrical shape and rotates about its axis in order to insure that the heat-carrying solids contact the rubber.

The heat-carrying solids may be metal or ceramic, but are preferably non-metallic. They may have any desired shape but preferably have a ball-like shape and are of approximately ¼ to ¾-inch in diameter. Typically, the heat-carrying solids will be smaller in size than the rubber particles. Alumina balls ½-inch in diameter are well suited for the pyrolysis and grinding step.

The heat carrying solids may be heated in a conventional ball heater utilizing a flue gas of sufficient temperature to heat the solids to rubber pyrolysis temperature. After heating, the heat-carrying solids are conveyed to the pyrolysis and grinding zone.

Either during or after the pyrolysis the hydrocarbon vapors and other gases formed during the pyrolysis step are separated from the solid material formed during pyrolysis. In the preferred exemplary embodiment, the hydrocarbon vapors and other gases are withdrawn as the vapors are formed during pyrolysis. The vapors may contain fine char particles which may be separated therefrom with conventional gas-solid separating equipment such as a cyclone. Thereafter, the vapors may be condensed, the light gases collected and the various fractions of hydrocarbon oils are separated into various fractions. In addition, any char particles which have not been removed by the gas-solid separating equipment may be removed from the liquid products by solid-liquid separating techniques such as filtering or centrifuging.

Generally, after separating the solids from the vapor and gases, the hydrocarbon vapors are separated from the other gases. The gases and vapors may be conducted to a fractionator where the hydrocarbon vapors are condensed, and the resulting liquid hydrocarbon product is preferably separated into two fractions: light oil and bottoms oil. Since the temperature at the top of the fractionator is above the boiling point of water, all gases (e.g. $CO_2$ and $H_2S$) and most of the steam are separated from the hydrocarbon vapors by allowing the steam and other gases to pass out of the fractionator top. Whatever steam remains in the hydrocarbon vapors can be separated therefrom, after condensing, by utilizing the differential in weight (density) between the water and hydrocarbon liquid.

The solid material from the pyrolysis is continuously withdrawn from the retort and the heat carrying solids utilized to heat the scrap rubber are separated from the solid products of pyrolysis in any convenient manner. Because the solid char obtained from the pyrolysis and grinding step is in the form of very fine particles, the separation can easily be accomplished by utilizing either the size differential or the differential in density between the char and the heat carrying solids which, in the preferred exemplary embodiment, are alumina balls of approximately ½-inch in diameter. For example, the alumina balls and char may be separated by either a vibrating screen or a rotating trommel having different size holes whereby the char will fall through the screen and the alumina balls or heat-carrying solids will remain on the screen or the char and balls will fall through different holes in the trommel thereby separating the two.

It should be noted that the char is cooled to less than about 400° F. in order to prevent oxidation of the char when it contacts the air.

If the starting scrap rubber does not contain fiberglass or steel the char which is obtained from the retort can be used to replace carbon black in various commercial processes. The char is substantially free of coke and decomposed rubber and will have a benzene discoloration number of at least about 70% and preferably at least about 90% and higher. In the preferred exemplary embodiment I have produced a char having a discoloration number of about 95% to as high as about 100%. The benzene discoloration number was determined by ASTM No. D-1618-72a.

In the preferred exemplary embodiment, scrap rubber is ground so that a substantial amount of the particles are greater than ½-inch in size, for example, three quarters of an inch in size. These particles are then dried in a drier in order to remove surface moisture therefrom. Thereafter, the ground and dried rubber particles are placed in a retort with alumina balls having a diameter of about ½-inch. The amount of alumina balls, by weight, in the preferred exemplary embodiment, is about 6 to 10 times the weight of the scrap rubber. The weight ratio between the rubber and the heat carrying solids which, in this instance, are alumina balls is variable and depends on the heat transfer requirements of the pyrolysis reaction. This ratio depends on the desired final retorting temperature and the temperature of the heat carrying solids entering the retort.

The retort is sealed to prevent oxygen contacting the rubber during pyrolysis. This is preferably done with steam. The retort (which has a diameter of two feet) is longitudinally rotated about its axis at an rpm of about 6 and the alumina balls are heated to a temperature of about 1100° F. to about 1300° F. when entering the retort to effect pyrolysis of the rubber which in this embodiment is a temperature of about 950° F. to about 1000° F. After pyrolysis has been completed the hydrocarbons are removed as a vapor, condensed and separated into various oil fractions. The solid char material is composed of very fine particles having an average diameter of less than about one micron and, generally, about 50 millimicrons or less. The particles had a benzene discoloration number of greater than 90% and were free, or at least substantially free of coke, non-decomposed rubber and there was no evidence of oxidation of the particles.

In the preferred exemplary embodiment the char particles have the following size distribution:

| Screen Size | | Percentage (by weight) |
| --- | --- | --- |
|  | +100 | 1.2 |
| −100 | +200 | 7.6 |
| −200 | +325 | 3.7 |
| −325 |  | 87.5 |

The char obtained by the pyrolysis of scrap rubber was, without further modification, able to be used as a substitute for carbon black in production of tires. However, in order to prevent "dusting" it is preferred if the particles are contacted with water and formed into pellets of appropriate size. As noted, the pellets may be used for many different purposes but such char pellets have been particularly useful in replacing carbon black for tire production.

In another exemplary embodiment, scrap rubber tires containing fiberglass and metal were ground, dried and pyrolyzed by contact with the heat curing alumina balls in the same manner as indicated above. The volatiles were removed and the solid particles separated from the alumina balls in the same manner as indicated above. However, since the initial starting scrap rubber contained fiberglass and steel the solid material resulting from a pyrolysis step also contained fiberglass and steel. I have ascertained that the fiberglass and steel should be removed from the char in order to render the char useful in replacing carbon black.

The char particles produced in the above step have approximately the same particle size indicated above. The steel wires remain unchanged in the retort and are a miscellaneous size while the fiberglass filaments have a diameter of about 9 microns and a length of up to one inch but, in general, the fiberglass is about 0.25 inches long.

In any event, after cooling of the char the steel is separated from the char by passing the char through a magnetic separator which attracts and holds the steel particles and separates the steel particles from the char particles as well as the fiberglass. Since the char particles are very small the char and fiberglass may be separated by a screen rotating in a horizontal plane which has a mesh size less than the length of the fiberglass filaments thereby allowing the char to pass through the screen but the screen retaining the fiberglass filament. In general, the screen size may be between 35 and 40 mesh but, again, this is not critical providing the screen size is sufficiently small to retain the fiberglass filaments.

The char produced in such a manner which has not been contacted by acids, bases or organic solvents can be utilized per se in replacing carbon black but, as in the case above, in order to prevent dusting it is preferable if the particles are contacted with water and then pelletized.

I claim:

1. A char material produced from rubber containing polymeric hydrocarbons and carbon black by simultaneously pyrolyzing and grinding said rubber in the absence of oxygen with heat carrying solids having a sufficient temperature and for a sufficient length of time to volatilize and depolymerize the hydrocarbons and produce a solid char material of very fine particle size, separating said volatilized and depolymerized hydrocarbons from said char particles, and cooling said char particles in the absence of oxygen to a temperature of less than 400° F., said cooled char particles being free of oxidation, substantially free of non-decomposed rubber and coke, having not been contacted with acid or bases, and having a benzene discoloration No. of greater than 70%.

2. A char according to claim 1 wherein said char is in the form of pellets.

3. A char according to claim 1 wherein the char particles are less than one micron in size.

4. A char according to claim 1 wherein the average char particle size is about 50 millimicrons or less.

5. A char produced from rubber containing polymeric hydrocarbons, carbon black, fiberglass and steel, by simultaneously pyrolyzing and grinding said rubber in the absence of oxygen with heat carrying solids having a sufficient temperature and for a sufficient length of time to volatilize and depolymerize the hydrocarbons and produce solid material comprising a solid char material of very fine particles, steel filaments and fiberglass filaments, separating said volatilized and depolymerized hydrocarbons from said solid material and cooling said solid material in the absence of oxygen to a temperature of less than 400° F., thereby preventing oxidation of said char material, separating the steel from said solid material by passing said solid material through a magnetic field, and removing the fiberglass filaments from said solid material by passing said solid material over a screen of sufficient mesh size to separate the char and the fiberglass filaments, said cooled char material being free of oxidation, substantially free of non-decomposed rubber and coke, having not been contacted with acid or bases and having a benzene discoloration No. of greater than 70%.

6. A char according to claim 5 wherein said char is in the form of pellets.

7. A char according to claim 5 wherein the average size of the char particles is less than one micron.

8. A char according to claim 5 wherein the average size of the char particles is 50 millimicrons or less.

9. A method for producing useful products from rubber containing polymeric hydrocarbons and carbon black which comprises simultaneously pyrolyzing and grinding the rubber in the absence of oxygen by contacting said rubber with heat carrying solids for a sufficient length of time to volatilize and depolymerize the hydrocarbons and produce a solid char material of very fine particle size and hydrocarbon vapors; separating the solid char material and the heat carrying solids from the hydrocarbon vapors; separating the heat carrying solids from the solid char material and cooling said char material to less than 400° F. in the absence of air in order to prevent oxidation of the char; said char particles being substantially free of oxidation, non-decomposed rubber, and coke, and having a benzene discoloration No. of greater than 70%; and reheating the heat carrying solids in said heating zone.

10. A method according to claim 9 wherein the rubber is dried before pyrolysis to remove substantially all of the surface moisture on the rubber.

11. A method according to claim 9 wherein the rubber contains fiberglass and steel, and the char composition produced contains fiberglass and steel, including the further step of separating the char from the fiberglass and metal by passing said composition through a magnetic field to remove the steel and over a screen of sufficient mesh size to remove the fiberglass.

* * * * *